(12) United States Patent
Wolf

(10) Patent No.: US 11,426,936 B2
(45) Date of Patent: Aug. 30, 2022

(54) SELF LEVELING COATING SYSTEM

(71) Applicant: O. R. Lasertechnologie GmbH, Dieburg (DE)

(72) Inventor: Markus Wolf, Dieburg (DE)

(73) Assignee: O. R. Lasertechnologie GmbH, Dieburg (DE)

( * ) Notice: Subject to any disclaimer, the term of this patent is extended or adjusted under 35 U.S.C. 154(b) by 245 days.

(21) Appl. No.: 16/830,153

(22) Filed: Mar. 25, 2020

(65) Prior Publication Data
US 2021/0299955 A1 Sep. 30, 2021

(51) Int. Cl.
| | |
|---|---|
| *B29C 64/214* | (2017.01) |
| *B29C 64/153* | (2017.01) |
| *B33Y 50/02* | (2015.01) |
| *B33Y 10/00* | (2015.01) |
| *B33Y 30/00* | (2015.01) |
| *B29C 64/393* | (2017.01) |

(52) U.S. Cl.
CPC .......... *B29C 64/214* (2017.08); *B29C 64/153* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/214; B29C 64/153; B29C 64/393; B33Y 10/00; B33Y 30/00; B33Y 50/02
See application file for complete search history.

(56) References Cited

U.S. PATENT DOCUMENTS

| | | | |
|---|---|---|---|
| 2013/0026680 A1* | 1/2013 | Ederer | B29C 64/176 |
| | | | 425/166 |
| 2017/0057173 A1 | 3/2017 | Van Der Zalm | |
| 2017/0361500 A1* | 12/2017 | Höchsmann | B29C 64/241 |
| 2018/0326712 A1* | 11/2018 | Raghavan | B29C 64/393 |
| 2019/0134911 A1* | 5/2019 | Jones | B29C 64/153 |
| 2020/0376757 A1* | 12/2020 | Binek | B33Y 50/02 |
| 2020/0384693 A1* | 12/2020 | Bennett | G06N 3/08 |
| 2021/0187861 A1* | 6/2021 | Zeulner | B29C 64/393 |

FOREIGN PATENT DOCUMENTS

| | | |
|---|---|---|
| CN | 103660300 A | 3/2014 |
| CN | 105344999 A | 2/2016 |
| CN | 107457405 A | 12/2017 |

OTHER PUBLICATIONS

Benedict,"FDM 3D printer bed leveling with cheap piezoelectric elements", www.3ders.org, Feb. 6, 2018, pp. 1-8.

* cited by examiner

*Primary Examiner* — Yung-Sheng M Tsui
(74) *Attorney, Agent, or Firm* — Morrison & Foerster LLP

(57) ABSTRACT

Additive manufacturing apparatuses and methods are provided. A coater having a rake moves above a build platform. A sensor measures topography of the build platform. A rake control unit receives the topography, determines (based on the topography) an adjustment of the rake's inclination relative to a reference plane as the coater moves from a first position above the platform to a second position above the platform, and sends command signals to a motor based on the adjustment. The motor adjusts an inclination of the rake relative to the reference plane as the coater moves from the first position to the second position.

8 Claims, 12 Drawing Sheets

SELF LEVELING COATING SYSTEM

TECHNICAL FIELD OF THE INVENTION

The present disclosure relates generally to additive manufacturing and, in particular, to levelling a build platform in a three-dimensional laser printing process.

DISCUSSION OF BACKGROUND ART

Additive manufacturing, a three-dimensional ("3-D") printing technique, involves depositing material and laser-irradiating the material to form a desired object. Material is deposited in layers, and the laser irradiates the material layer-by-layer to build cross-sections of the object according to a 3-D model. Non-irradiated material is removed (for example, material is removed between layers or after all layers of the object are formed) to produce the 3-D object. Two examples of additive manufacturing include laser selective sintering and laser selective melting.

Additive manufacturing apparatuses can include four main components: a material source, a coater, a build platform, and a laser. The object is built layer-by-layer on the build platform. In each layer, the coater distributes material from the material source to a desired height across the build platform and the already-completed layers. The laser then sinters (for example) the material to create cross-sections corresponding to the 3-D model.

The material, typically a powder, is collected by the coater at the material source and distributed in a layer over the build platform. The coater can follow a variety of paths, including arcuate and linear. With an arcuate path, the coater rotates about a central axis and passes sequentially over the material source and the build platform. With a linear path, the coater reciprocally moves back and forth over the material source and the build platform. The coater may have a rake at the closest point to the build platform, thereby setting the separation between the coater and the build platform and, thus, setting the thickness of the material layer deposited.

Typically, each deposited layer height is on the order of 5 to 150 µm. After the layer is deposited, a laser selectively melts material that corresponds to the cross-section of the object. After the melted material in the layer has solidified, the build platform lowers (by action of, for example, a piston under the platform) the object so that the next layer is deposited at approximately the same distance from the laser. Similarly, the material source may rise (by action of, for example, a piston under the platform) so that the coater can collect another volume of material to distribute as the next layer. The coater then moves across the material source and build platform to distribute the next layer of material.

In this way, printing of the material continues layer by layer until the object is completed. When the object is completed, it is removed from the build platform and the additive manufacturing process may restart for a new object.

Object removal, however, can negatively influence the success of the next object's manufacture. For example, some material may remain on the build platform after the object's manufacture and must be removed before the next object's manufacturing process begins. Chemical and/or mechanical polishing techniques are typically used to remove residue and level the build platform. In some cases, aggressive polishing can produce a near planar surface, but introduce an undesirable inclination relative to the intended plane of the build platform. Although these techniques may improve the overall planarity of the build platform, they frequently introduce irregular topography to the build platform. This topography can lead to additional problems, such as incomplete fusing of material in the initial layers of the next object.

Known solutions to the topography problem include tilting the coater relative to the build platform using leveling screws and/or adding partial layers of material, then fusing the partial layers to level the build platform before adding the first layer of the object to be printed.

SUMMARY OF THE INVENTION

Known solutions fail to address topography issues of build platforms in additive manufacturing. First, known solutions do not accurately position the coater above the platform. This can lead to multiple deficiencies in the initial layers, such as layers that are too thick and thus not fully melted or sintered when irradiated by the laser. Second, known solutions can address a sloped topography, but cannot compensate for topographies that vary in multiple directions. For example, if a build platform topography includes parallel ridges and valleys, then known solutions cannot deposit the material selectively such that more material is added and fused in the troughs (thereby "filling" the troughs). Further, if the ridges and valleys have different heights (for example, with an irregular topography), then known solutions fail because they cannot vary material addition in multiple directions to account for the irregular topography. Typically, the desired build platform is planar, but without compensation for variations in the multiple directions, the build platform cannot be easily leveled which may result in incomplete fusing of the object.

Aspects of this disclosure provide for compensation of topography variations in multiple directions, advantageously providing a more level build platform for object manufacture. In one aspect, a selective laser melting apparatus includes a build platform, a coater having a rake, a sensor, a motor, and a rake control unit. The motor adjusts an inclination of the rake relative to a reference plane as the coater moves from a first position to a second position. The sensor measures a topography of the build platform and the rake control unit receives the topography from the sensor, determines (based on the topography) an adjustment of the rake's inclination as the coater moves from the first position to the second position, and sends command signals to the motor based on the adjustment.

As used herein, a "reference plane" can be understood to be any plane that does not move as the coater moves during the additive manufacturing process. The reference plane can be, for example, a desired plane of the build platform. By changing inclination relative to this reference plane, the selective melting apparatus can deposit material of varying depth, thereby adding material to the build platform at different rates. As the material is deposited at different rates and then fused after each deposition, the build platform topography approaches the desired plane over multiple passes of the coater. One skilled in the art will understand that other reference planes could be used without deviating from the scope of this disclosure. For example, a reference plane could be taken at the level of a build table. As the coater changes inclination relative to this reference plane, the selective melting apparatus can add material at different rates to achieve a desired build platform profile.

In one aspect, a method of additive melting includes measuring a topography of a build platform, moving a coater (having a rake) in a plane above the build platform, determining (based on the topography) an inclination adjustment of the rake as the coater moves from a first position to a second position above the build platform, and adjusting (based on the determined inclination adjustment) an inclination of the rake relative to a reference plane as the coater moves from the first position to the second position.

BRIEF DESCRIPTION OF THE DRAWINGS

The accompanying drawings, which are incorporated in and constitute a part of the specification, schematically illustrate exemplary embodiments, and together with the general description given above and the detailed description of the embodiments given below, serve to explain principles of the present invention.

DETAILED DESCRIPTION OF THE INVENTION

Figure 1A:
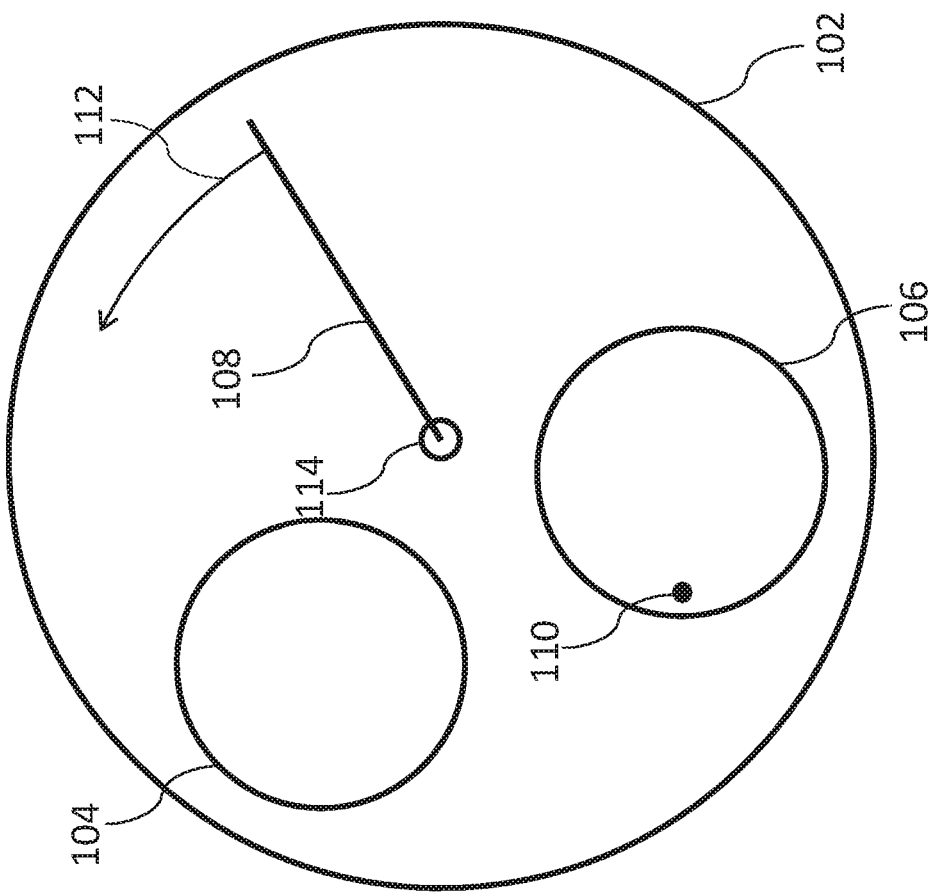
FIG. 1A is a plan-view schematically illustrating an additive manufacturing apparatus in accordance with an embodiment, the apparatus including a build table, a build platform, a material source, a coater following an arcuate path over the build platform and the material source, and a focused laser beam.

Turning now to the drawings, wherein like features are designated by like reference numerals, FIG. 1A is a plan-view schematically illustrating an additive manufacturing apparatus 100 in accordance with an embodiment. Apparatus 100 includes build table 102, material source 104, build platform 106, coater 108, and a laser source (not shown) providing a laser beam focused to an irradiation spot 110. Coater 108 follows arcuate path 112 over build table 102 (from material source 104 to build platform 106) by rotating about axis 114 (which extends out of the page). Coater 108 moves in a plane of motion (not shown) which includes arcuate path 112. Coater 108 may include any of the coaters described herein, including coater 300, coater 502, and coater 602.

Material source 104 provides a material to be spread across build platform 106. The material may comprise a powder (or other flowable substance) which is deposited on build platform 106 by coater 108. The deposited material covers the build platform and fills the space between coater 108 and build platform 106. The material is fused, by directing the focused laser beam to move the irradiation spot 110, in a desired configuration that corresponds to a cross-section of the object to be printed. The coater moves across build table 102 in a circle so that it successively passes over material source 104 and build platform 106. While coater 108 is not above build platform 106, irradiation spot 110 may move across the layer of deposited material to fuse it in a desired configuration. In some embodiments, coater 108 moves in a reciprocal arcuate path between material source 104 and build platform 106.

Exemplary dimensions for apparatus 100 include: a coater width of 120 mm, a build platform diameter of 100 mm and stroke of 100 mm, and a material source diameter of 110 mm and stroke of 100-400 mm. Irradiation spot 110 can travel at a 6 ms$^{-1}$ scan speed. The laser source can provide a laser beam having a power of up to 250 W at a wavelength of 1070 nm. An exemplary diameter of irradiation spot 110 is approximately 40 μm. Exemplary layer thicknesses are 20 to 100 μm. These dimensions are exemplary and one of skill in the art will recognize that apparatus 100 can have other dimensions without deviating from the subject matter of this disclosure.

Figure 1B:
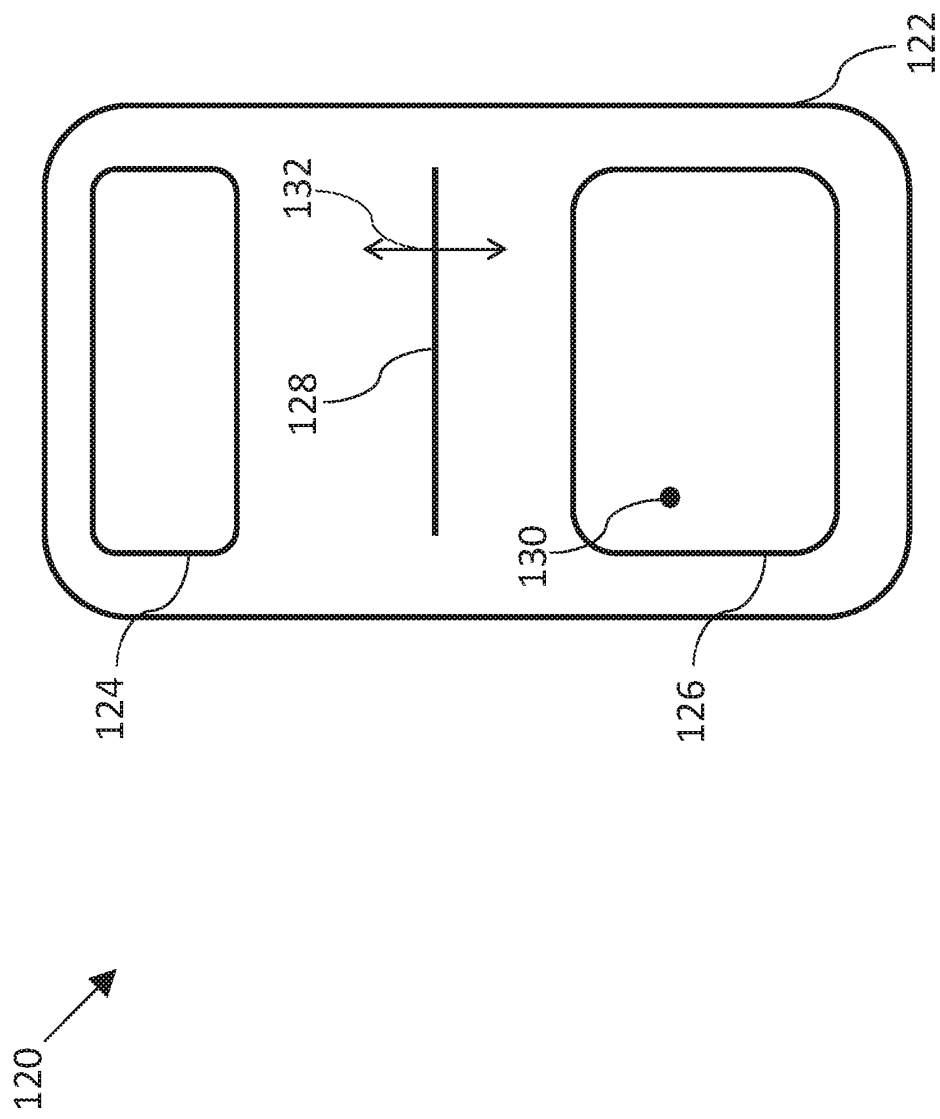
FIG. 1B is a plan-view schematically illustrating an additive manufacturing apparatus in accordance with an embodiment, the apparatus including a build table, a build platform, a material source, a coater following a linear path over the build platform and the material source, and a focused laser beam.

FIG. 1B is a plan-view schematically illustrating another additive manufacturing apparatus 120 in accordance with an embodiment. Apparatus 120 includes build table 122, material source 124, build platform 126, coater 128, and a laser source (not shown) providing irradiation spot 130. Coater 128 follows linear path 132 over build table 122, reciprocally moving over the material source 124 and over the build platform 126. Coater 128 moves in a plane of motion (not shown) which includes linear path 132. In such reciprocal motion embodiments, build platform 126 may drop in height, coater 128 may deposit material by moving in a plane from material source 124 to build platform 126, coater 128 moves back toward and completely over material source 124, and then material source 124 rises. Coater 128 may include any of the coaters described herein, including coaters 300, 502, and 602. Apparatus 120 builds an object in much the same manner as apparatus 100; a primary difference is the respective path taken by coaters 108 and 128.

Exemplary dimensions for apparatus 120 include: a build platform width of 100-250 mm and stroke of 100 mm, and a material source width of 100-250 mm and stroke of 100-400 mm. The coater can travel at 100 mms$^{-1}$ when depositing material and 20 mms$^{-1}$ when not. Irradiation spot 130 can travel at a 6 ms$^{-1}$ scan speed. The laser source can provide a laser beam having a power of up to 1,000 W at a wavelength of 1070 nm. An exemplary diameter of irradiation spot 130 is typically between 40 and 60 μm. Exemplary layer thicknesses are 20 to 100 μm. These dimensions are exemplary and one of skill in the art will recognize that apparatus 120 can have other dimensions without deviating from the subject matter of this disclosure.

Figure 2:
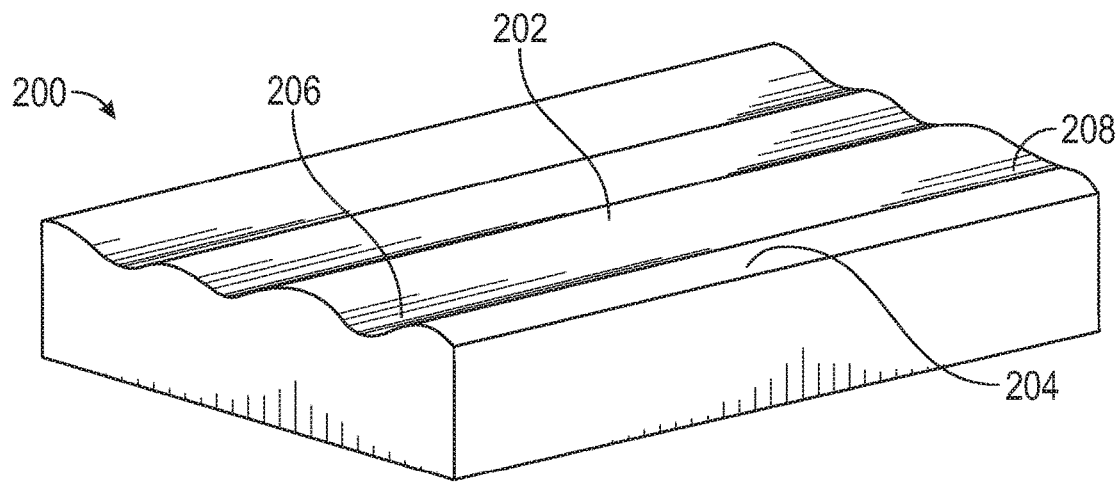
FIG. 2 is a three-dimensional view of an exemplary additive manufacturing build platform following removal of a completed object, in accordance with an embodiment.

FIG. 2 is a three-dimensional view of exemplary build platform 200 following additive manufacturing, in accordance with an embodiment. Build platform 200 includes an irregular topography which may result from residue due to a previous build and/or chemical or mechanical polishing. These irregularities have been exaggerated in the drawing for purposes of illustration.

Build platform 200's topography includes a valley between ridges 202 and 204. Ridges 202 and 204 are depicted as parallel, but it should be appreciated that this depiction is for illustrative purposes and is not limiting. Between ridges 202 and 204 is a valley of varying depth, with a maximum depth at 206 and a minimum depth at 208. It will be appreciated that the topography of build platform 200 is exemplary and other build platforms could have different topographies. Further, build platform 200 is shown as rectangular (corresponding to build platform 126), but it should be appreciated that the build platform shape is not limiting and could, for example, be circular (such as build platform 106). Build platform 200 may represent a subportion of a larger build platform, such as build platform 106 and build platform 126.

Build platform 200's irregular topography presents a challenge to prior art solutions. As shown in FIG. 2, a build platform may have many ridges and valleys, which could be filled by moving a coater at constant height over build platform 200 and irradiating the deposited material. This may result in a layer of deposited material with a level surface. However, if the valleys of the build platform are deeper than a maximum melting depth, then some deposited material will not be fused to the build platform. For example, deposited material in the deepest locations (such as 206) may not be fused to the build platform. Although the embodiments herein are primarily discussed with reference to laser melting, one of skill in the art will appreciate that the disclosure applies to other additive manufacturing process. Other mechanisms for hardening or fusing the power material include, but are not limited to, laser sintering.

Figure 3A:
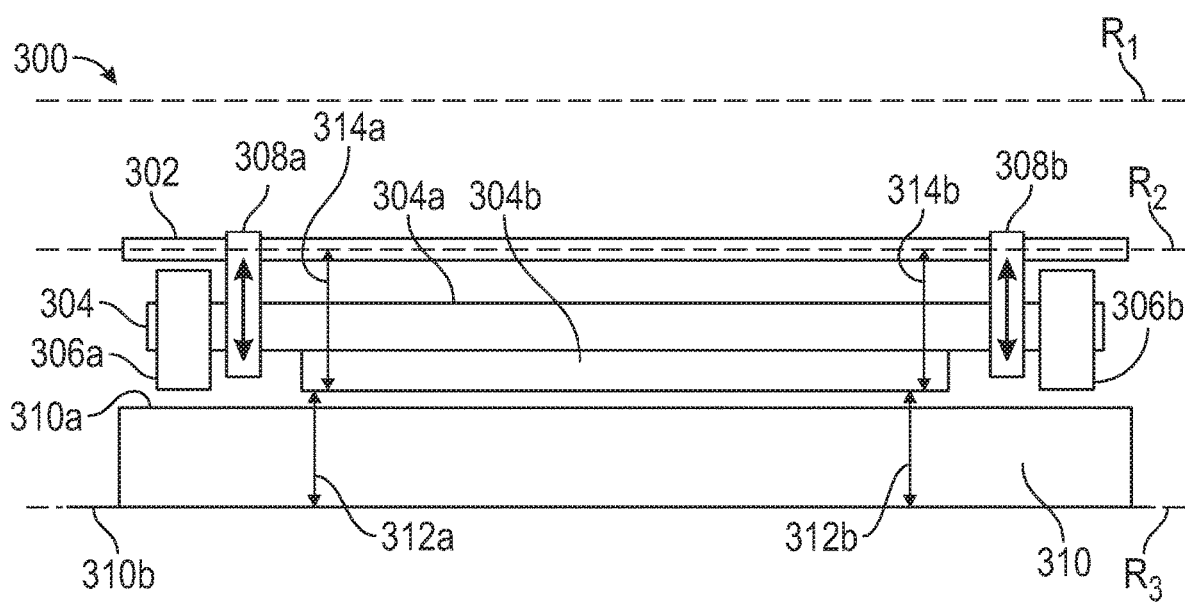
FIG. 3A is a schematic of an additive manufacturing coater and a build platform in accordance with an embodiment. The coater includes a coater frame, a rake moveable relative to the coater frame, sensors to detect a build platform topography, and motors to move the rake relative to the coater frame and build table.

FIG. 3A is a schematic view of an additive manufacturing coater 300 and a build platform 310, in accordance with an embodiment. In some embodiments, coater 300 is coater 108 or coater 128 described above. In some embodiments, build platform 310 is build platform 106, build platform 126, or build platform 200 described above.

Coater 300 moves above build platform 310 following, for example, an arcuate path (such as path 112 discussed above) or a linear path (such as linear path 132 discussed above) within a plane of motion. Build platform 310 includes base 310b, surface cross section 310a (FIG. 3A), and surface cross section 310c (FIG. 3B).

Coater 300 includes coater frame 302 and rake 304 moveable relative to a reference plane. The rake 304 includes blade support 304a and blade 304b that distributes material over build platform 310. The thickness of a layer of deposited material is controlled by setting a separation between blade 304b and build platform 310.

Figure 3B:
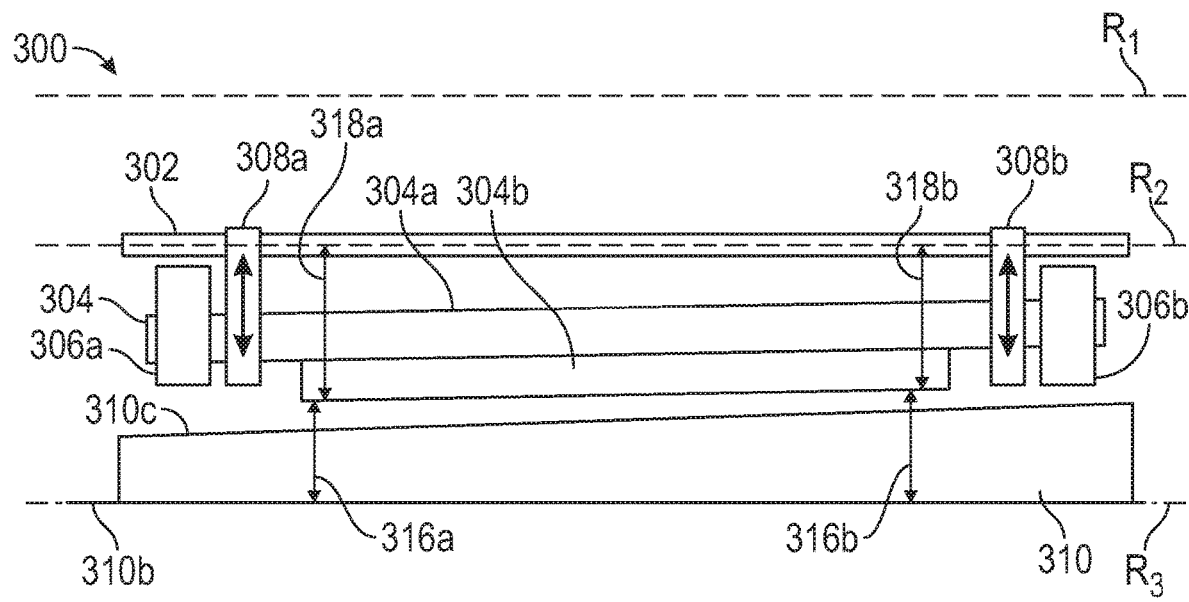
FIG. 3B is a schematic of the additive manufacturing coater and build platform of FIG. 3A after an inclination adjustment of the rake relative to a reference plane.

FIGS. 3A and 3B illustrate three parallel reference planes (R1, R2, and R3) for explanatory purposes. Reference plane R1 extends into and out of the view in FIG. 3A, and is spaced and parallel to a desired plane of the build platform surface. Reference plane R2 includes the surface of coater frame 302 and defines a plane as the coater 300 (and coater frame 302) moves during the manufacturing process. As used herein, a coater frame can be understood to be a component of apparatus 300 that supports rake 304 and does change inclination relative to a reference plane (thereby providing an anchor point to change the inclination of rake 304 relative to the reference plane). Coater frame 302 can be, as shown in apparatus 300, positioned above rake 304 so that rake 304's height and inclination are affected by changes in separation between rake 304 and coater frame 302. In such orientations of a rake and coater frame, motors 308a and 308b (described further below) may include linear actuators. The coater's plane of motion can be understood to include coater 302 and extend in a direction parallel to the direction of motion of rake coater 302. Reference plane R3 includes a level surface of a base (e.g., a build table) of build platform 310. One skilled in the art will understand that these reference planes are exemplary and other reference planes could be used, provided the reference plane does not change as coater 300 moves.

Sensors 306a and 306b measure the topography of surface cross section 310a of build platform 310. The sensors may include non-contact capacitive displacement sensors. In some embodiments, the sensors include laser distance meters. In some embodiments, sections of the topography are measured (e.g., the sections of the topography within the horizontal (from the perspective given in FIG. 3A) range of sensors 306a and 306b of coater 300). In some embodiments, sensors 306a and 306b measure the topography of the surface by a measuring a distance from the respective sensor to the surface (for example, as described with respect to FIGS. 6A-6D below).

Motors 308a and 308b move rake 304 relative to the reference planes R1, R2, and R3. In some embodiments, motors 308a and 308b adjust at least one of two separations of rake 304 relative to a reference plane as coater 300 moves from a first position to a second position. As used herein, adjusting at least one of two separations of a rake relative to a reference plane can be understood to include changing the distance from the rake to the reference plane at (at least) one of two positions along the rake. In FIG. 3A, rake 304 is separated from reference plane R3 310b by separations 312a and 312b. In FIG. 3A, rake 304 is separated from reference plane R2 by separations 314a and 314b. Adjusting at least one separation of the rake from a reference plane changes an inclination of the rake relative to the reference plane.

FIG. 3B illustrates coater 300 after movement of the coater from a first position to a second position and a change in inclination of rake 304 relative to the reference planes. The surface cross section 310a is now surface cross section 310c, which may represent, for example, travel from a first position of build platform 200 that includes ridge 202 to a second position of build platform 200 that includes valley 206. Comparing FIGS. 3A and 3B, motors 308a and 308b have changed separations of rake 304 relative to reference planes R1, R2, and R3, thereby changing an inclination of rake 304 relative to the reference planes. Using reference plane R3 for illustration, the change in inclination caused an adjustment of separations 312a and 312b to 316a and 316b, respectively. Using reference frame R2, the change in inclination caused an adjustment of separations 314a and 314b to 318a and 318b, respectively. Changing the inclination may advantageously allow coater 300 to deposit a layer of varying thickness according to the topography, but with a maximum layer thickness that is less than a maximum melting depth. In this way, coater 300 can advantageously allow for full melting and fusing of a deposited layer even when faced with an uneven topography of build platform 310.

In some embodiments, the position of rake 304 is controlled by a rake control unit (not shown) that: receives the topography of build platform 310, determines (based on the topography) an adjustment of the inclination of rake 304 as coater 300 moves from the first position to the second position, and sends command signals to the motor(s) based on the determined adjustment. In some embodiments, the first position corresponds to the coater 300 depositing a first layer of material and the second position corresponds to coater 300 depositing a second layer of material. In such embodiments, coater 300 is used to create a series of planar surfaces, where each layer is irradiated before the next layer is added. In such embodiments, an initial topography may be planar, but not level. Such a topography can be addressed with a series of inclination adjustments for each layer; inclination adjustments during deposition of each layer can be forgone. Such embodiments may also include an initially non-planar topography that becomes a planar, non-level topography after a series of layer deposits; inclination adjustments during deposition of each layer can be forgone. In these embodiments, the rake 304 has constant inclination while depositing a single layer of material and then changes inclination for the next layer of material.

Figure 3C:
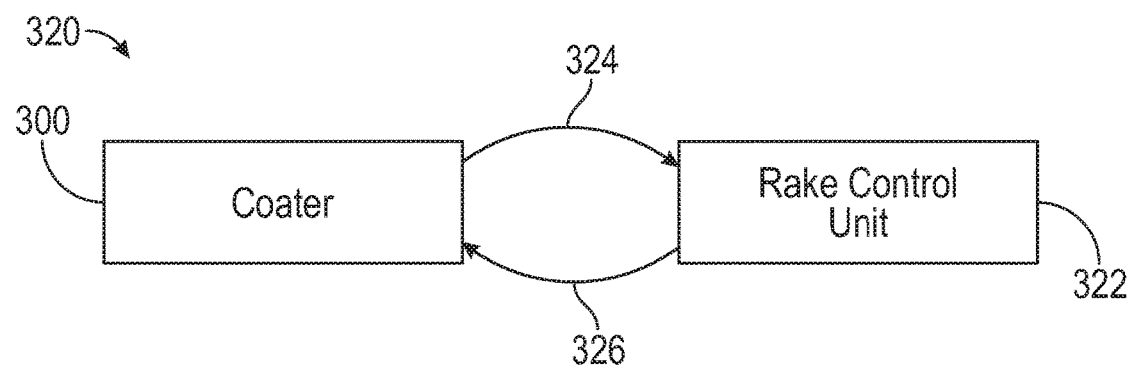
FIG. 3C is a diagram of an additive manufacturing coater and rake control unit in accordance with an embodiment.

FIG. 3C is a diagram of an additive manufacturing apparatus including coater 300 and rake control unit 322 in accordance with an embodiment. Sensors provide a topography of the build platform to rake control unit 322. As depicted in FIG. 3C, the sensors may be associated with coater 300 and thus coater 300 may provide the topography along signal line 324. Rake control unit 322 receives the topography, determines (based on the topography) an adjustment of the inclination of a rake as the coater moves from a first position to a second position, and sends command signals 326 to the coater for adjusting the rake. In some embodiments, rake control unit 322 sends a command signal for a first inclination adjustment and a second inclination adjustment of the rake at the same position, whereby the coater 300 adjusts the inclination of the rake on separate traversals of the same path over the build platform. In these embodiments, the controller analyzes the topography and determines an inclination of the rake for each position during each traversal to efficiently level the build platform. This leveling can be optimized to use a minimum amount of material and/or a minimum number of traversals.

FIGS. 4A-4G illustrate an exemplary build platform levelling process 400, in accordance with an embodiment. In process 400, rake 304 changes inclination to provide a succession of layers of different thickness to a cross-section of build platform 310. As each layer of material is added, a laser irradiates the material to fuse and solidify the material, thereby allowing another layer of material to be deposited. The cross-sections depicted in FIGS. 4A-4G may correspond to the valley with maximum depth at 206 and minimum depth at 208 shown above in FIG. 2. At the cross-section shown in FIG. 4A, the drawing depicts a topography with a linear slope, but it should be appreciated that slopes having other shapes are within the scope of this disclosure.

Also, although all of rake 304 is depicted as changing inclination, it should be appreciated that this is for ease of description and, as described above with respect to FIGS. 3A and 3B, some elements (such as rake 304) of coater 300 may change inclination while other elements (such as coater frame 302) do not change inclination. Further, only a portion of build platform 310 is illustrated, for ease of description, but build platform 310 may extend further in the direction of motion of rake 304.

Figure 4A:
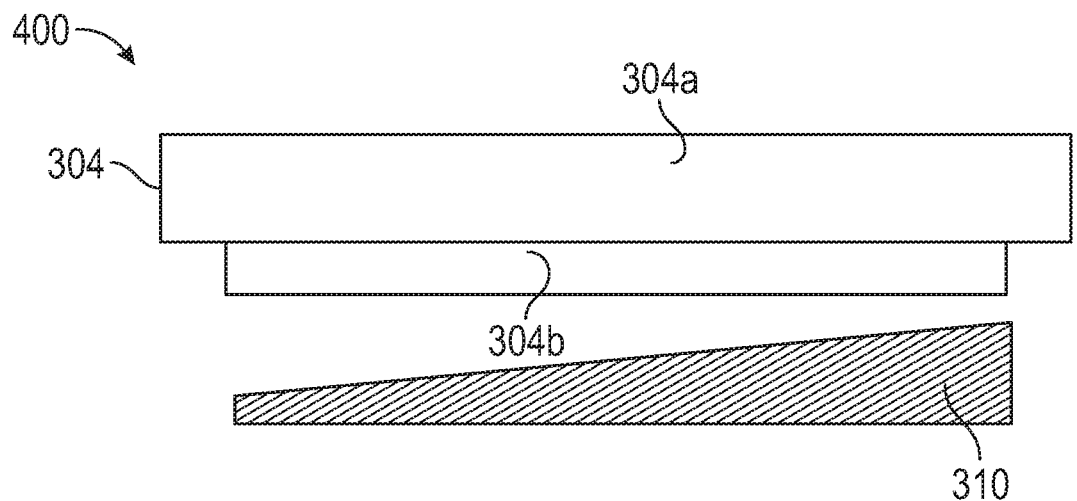
FIGS. 4A-4G illustrate an exemplary build platform levelling process, in accordance with an embodiment.

In FIG. 4A, coater 300 (depicted in FIG. 4A with rake 304) passes over build platform 310 to measure the topography of build platform 310. Measurement may be taken with sensors 306a and 306b described above. The measured topography is then sent to a rake control unit (e.g., rake control unit 322) that determines an inclination of the rake relative to build platform 310 so that material is deposited in a desired distribution across the topography of build platform 310. This distribution may require deposition of multiple layers, as described below in FIGS. 4B-4G. It should be appreciated that the sequence of depositions given in FIGS. 4B-4G is exemplary and other sequences could be used to achieve the same final level of the build platform.

In some embodiments, coater 300 determines the topography of the build platform while depositing material. In such embodiments, the step shown in FIG. 4A may be combined with the step shown in FIG. 4B. In some embodiments, determining the topography may be performed using a system separate from the coater, e.g., a separate light detection and ranging (LIDAR) device as described herein.

Figure 4B:
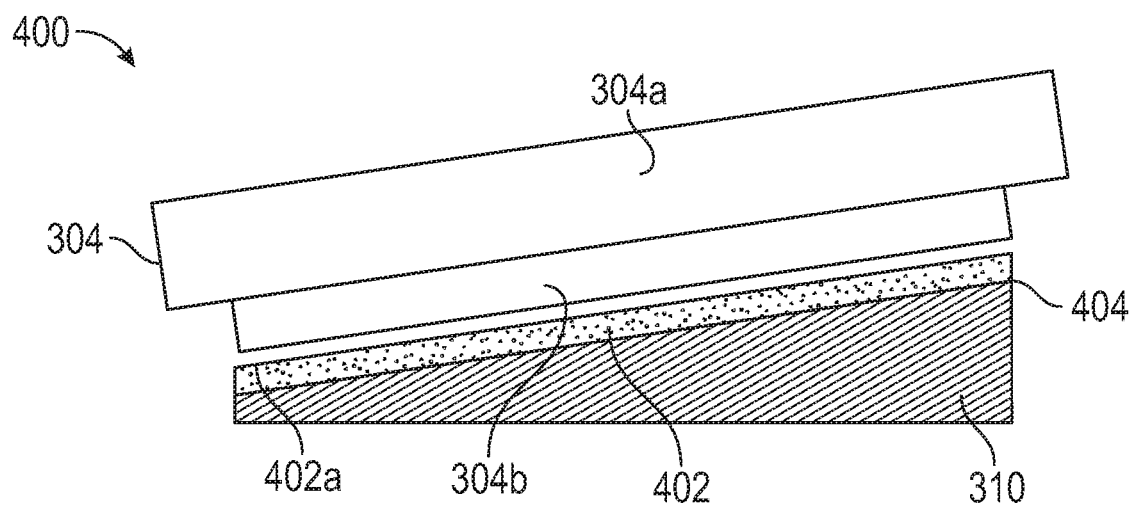

In FIG. 4B, a powder layer is applied with rake 304 inclined relative to build platform 310 and a reference plane. For example, a 25 μm powder layer can be added; other processes may have different depths. In this first pass, rake 304 is positioned parallel to the build platform surface so that a uniform-thickness layer is added to build platform 310. This may be necessary to bring the overall height of the depicted cross-sectional portion to a desired level. For example, the highest point 404 at the cross-section may be below a desired height of build platform 310 and thus the entire cross-section may need to be raised.

Figure 4C:
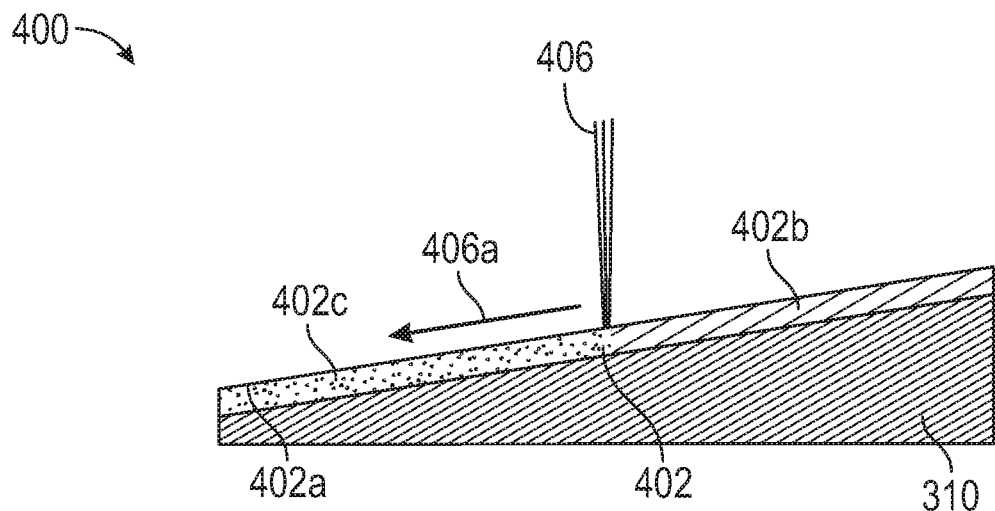
Figure 4D:
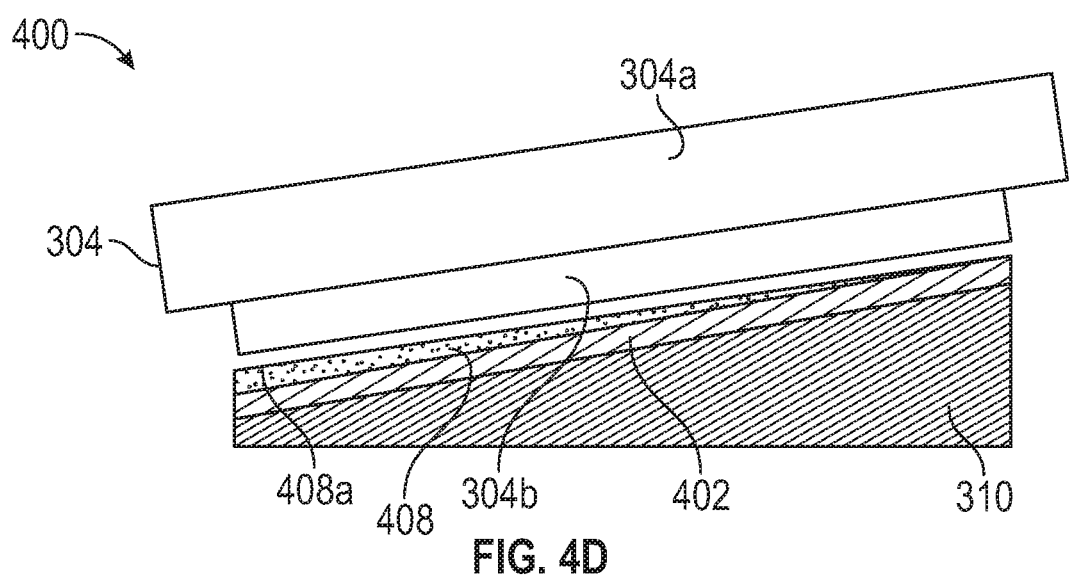

After the deposition in FIG. 4B but before the deposition in FIG. 4D, a laser fuses the material 402 to build platform 310. FIG. 4C illustrates laser beam 406 moving in direction 406a and focusing to a radiation spot on material in layer 402. As laser beam 406 moves across layer 402, it fuses the material to create a hardened portion 402b from the powder material portion 402c of layer 402. When laser beam 406 reaches the end of the layer, all material has been hardened, giving the build platform a new surface 402a.

After the laser beam fuses material but before deposition (e.g., between FIGS. 4C and 4D), an additional measurement (as shown in FIG. 4A) of the topography may be taken. In other embodiments, only one measurement (FIG. 4A) is taken at the beginning of the the levelling process.

In FIG. 4D, the height of the surface of build platform 310 is non-uniformly increased by adding more material in layer 408. In this powder deposition step, rake 304 is not parallel with surface 402a (i.e., the level defined by the deposition and melting illustrated in FIGS. 4B and 4C), i.e., not parallel with the surface of the build platform. The angled rake deposits a layer of non-uniform thickness, providing less material at the higher end (where the surface of build platform is at the desired height). This gives the build platform a new layer 408 with surface 408a having slope different than surface 402a.

Figure 4E:
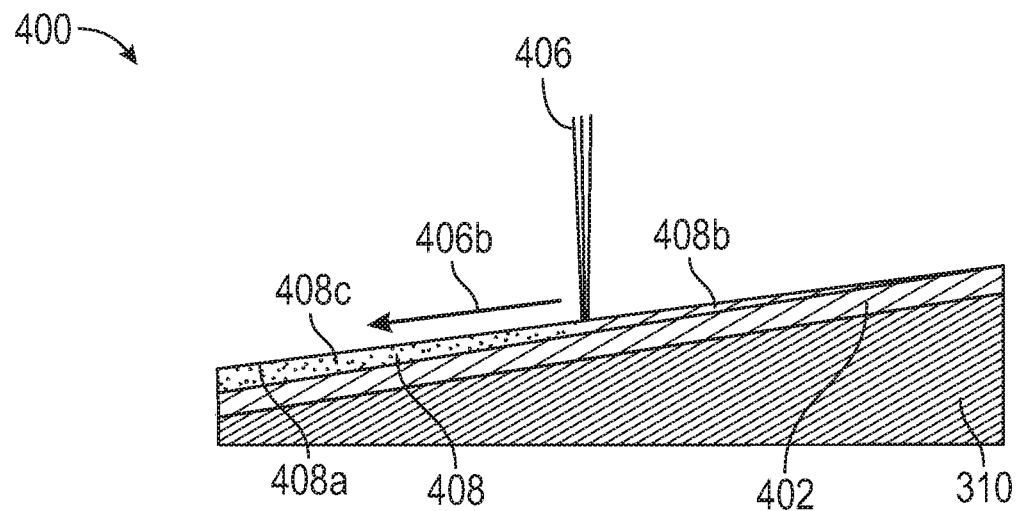
Figure 4F:
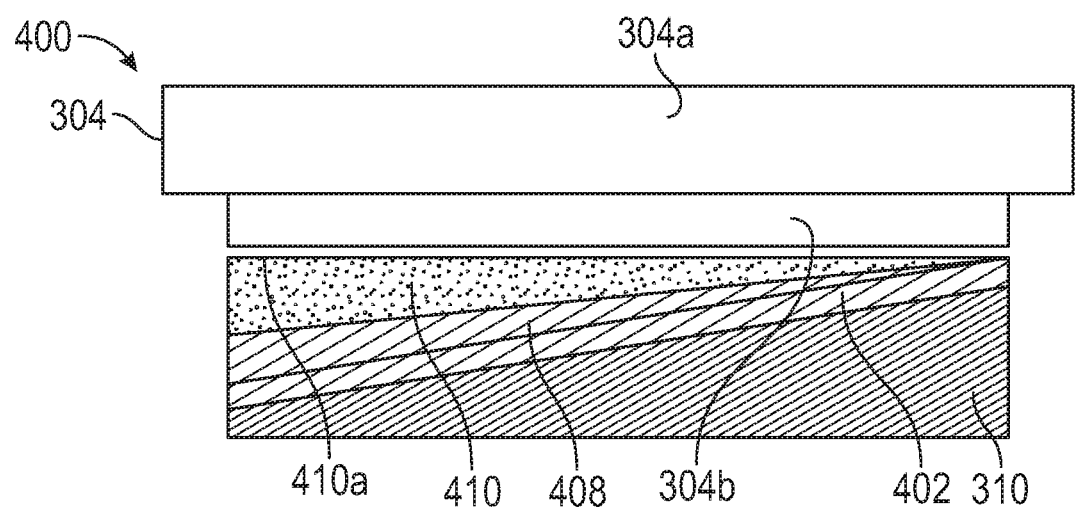

After the deposition in FIG. 4D but before the deposition in FIG. 4F, a laser fuses the material to build platform 310. FIG. 4E illustrates laser beam 406 moving in direction 406b and focusing to a radiation spot on material in layer 408. As laser beam 406 moves across layer 408, it fuses the material to create a hardened portion 408b from the powder material portion 408c of layer 402. When laser beam 406 reaches the end of the layer, all material has been hardened, giving the build platform a new surface 408a.

In FIG. 4F, rake 304 is again not parallel with the previous surface 408a (the level defined by the deposition and melting illustrated in FIGS. 4D and 4E). Adding the material in FIG. 4F produces layer 410 with surface 410a that is level (with respect to an additive material apparatus, an original level, a design goal for a starting position of a particular 3-D model, or a reference plane).

Figure 4G:
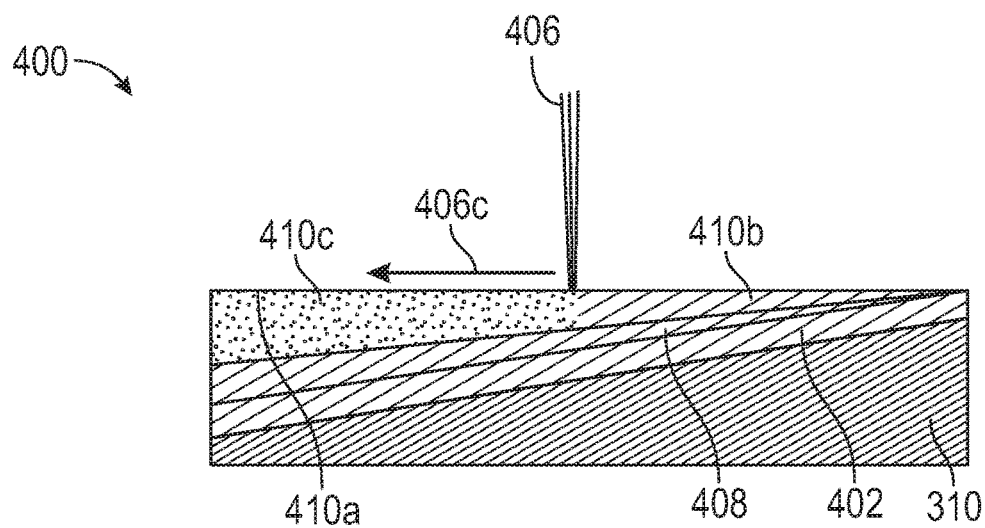

FIG. 4G illustrates laser beam 406 moving in direction 406c and focusing to a radiation spot on material in layer 410. As laser beam 406 moves across layer 410, it fuses the material to create a hardened portion 410b from the powder material portion 410c of layer 410. When laser beam 406 reaches the end of the layer, all material has been hardened, giving the build platform a new surface 410a that is level with respect to an additive material apparatus, an original level, a design goal for a starting position of a particular 3-D model, or a reference plane.

Figure 5A:
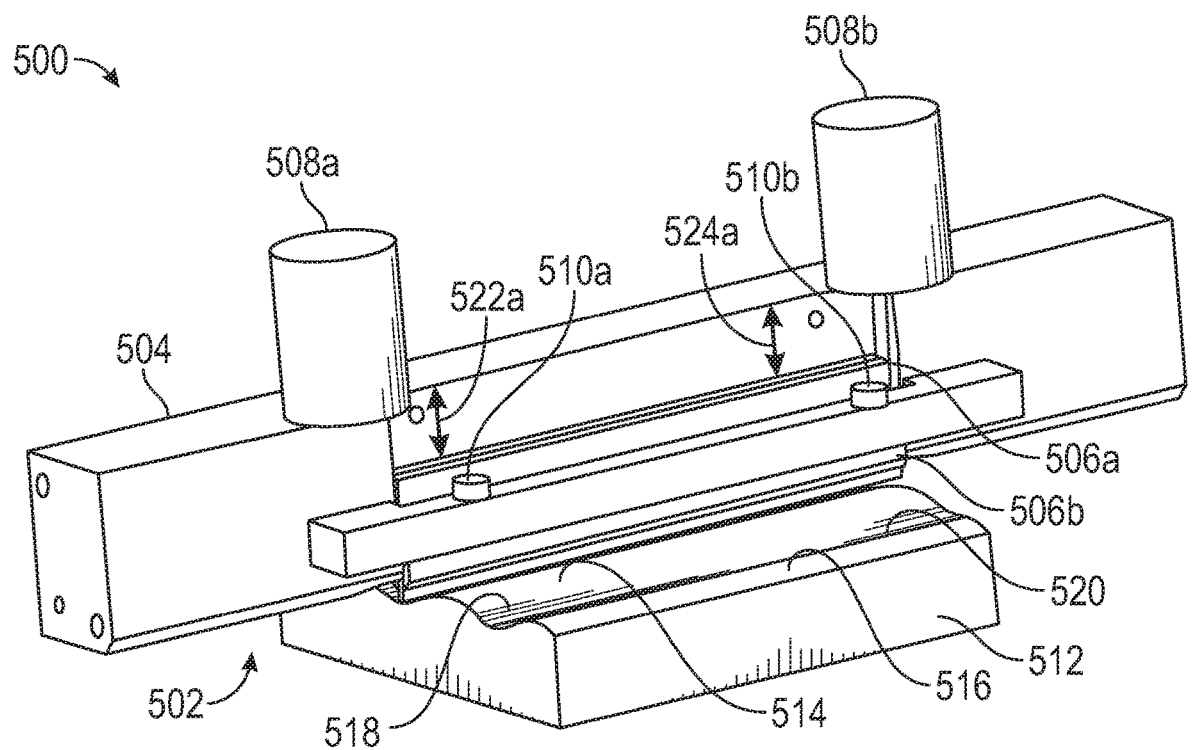
FIGS. 5A-5C illustrate an exemplary build platform levelling process, in accordance with an embodiment.
Figure 5B:
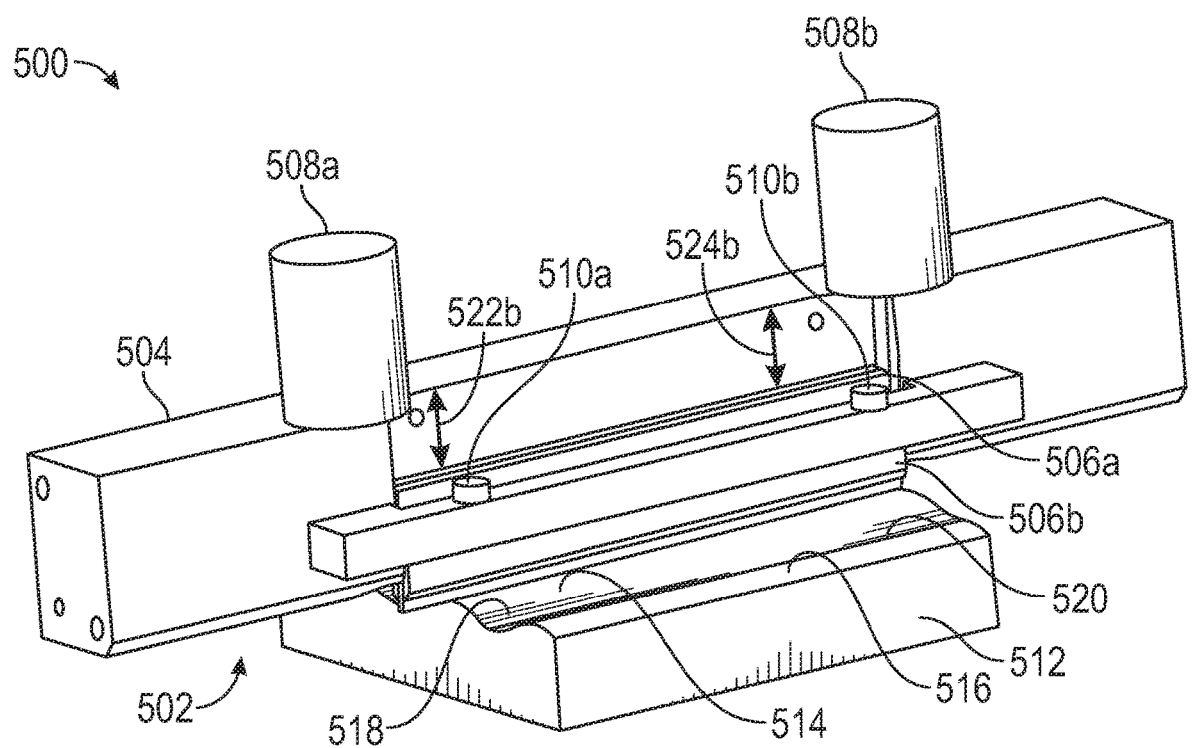
Figure 5C:
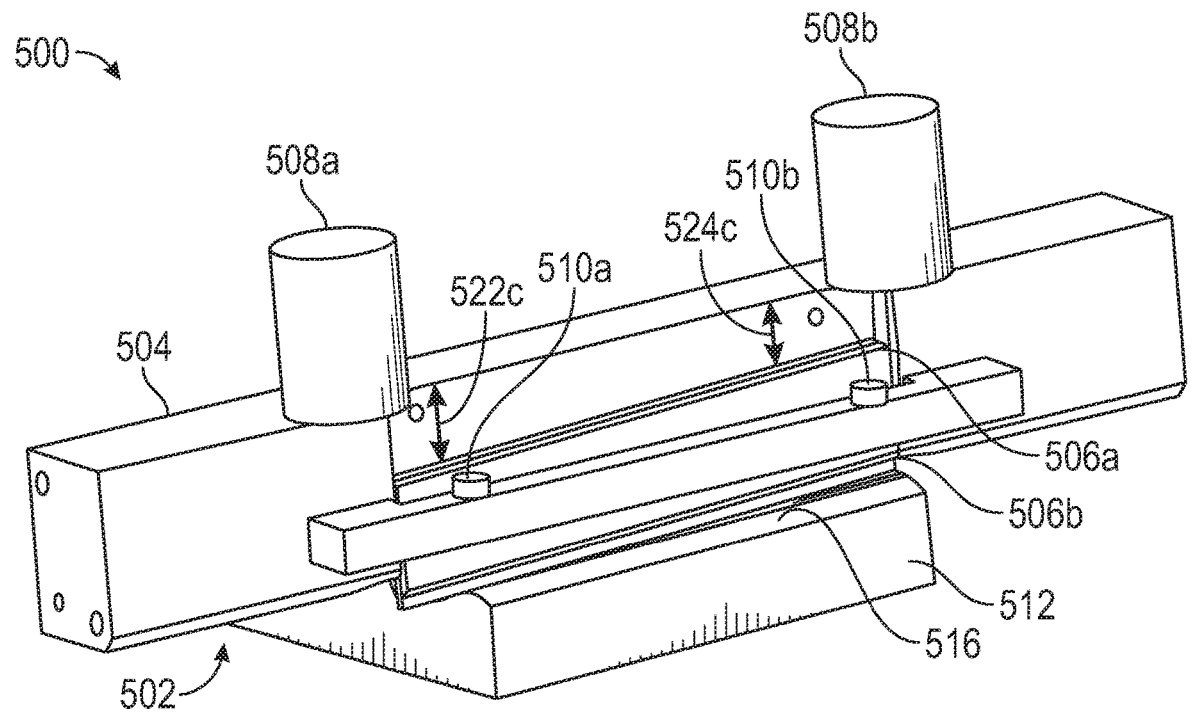

FIGS. 5A-5C illustrate an exemplary build platform levelling process 500, in accordance with an embodiment. In FIGS. 5A-5C, coater 502 passes over build platform 512. Coater 502 includes rake support 504, a rake comprising blade support 506a and blade 506b, motors 508a and 508b, and sensors 510a and 510b. Coater 502 may be coater 108, coater 128, or rake 304 described above. Build platform 512 has exemplary topography which includes a valley between ridges 514 and 516, where the valley has a maximum depth at 518 and a minimum depth at 520. Build platform 512 may be build platform 106, build platform 126, build platform 200, or build platform 310 described above or rake 602 described below.

In some embodiments, the separation of blade support 506a and blade 506b (and thus the inclination of the rake relative to a reference plane) is controlled by a rake control unit (not shown) that receives the topography of build platform 512, determines (based on the topography) a translation for each end of blade support 506a and blade 506b as coater 502 moves from the first position to a second position, and sends command signals to motors 508a and 508b based on the determined adjustment.

FIG. 5A-5C depict coater 502 at a first, a second, and a third position on build platform 512 respectively. At the first position, blade 506a has a first inclination relative to a reference plane; at the second position blade 506a has the same first inclination relative to the reference plane but a different separation, and at the third position blade 506a has a second inclination relative to the reference plane. This can be seen by the two relative positions 522a (522b, 522c) and 524a (524b, 524c) between the coater frame 504 and the top of the blade support 506a at the first position (second position, third position respectively). The separations and inclinations may have been determined by a rake control unit after receiving a measurement of the topography of build platform 512.

In some embodiments, process 500 and coater 502 are used to create a series of planar surfaces, where each layer is irradiated before the next layer is added. In such embodiments, an initial topography may be planar, but not level. Such a topography can be addressed with a series of inclination adjustments for each layer; inclination adjustments during deposition of each layer can be forgone. Such embodiments may also include an initially non-planar topography that becomes a planar, non-level topography after a series of layer deposits; inclination adjustments during deposition of each layer can be forgone. In these embodiments, the rake 504 has constant inclination while depositing a single layer of material and then changes inclination for the next layer of material.

FIGS. 6A-6D illustrate an exemplary build platform levelling process 600, in accordance with an embodiment. In process 600, coater 602 includes a rake 604 and a sensor 606 separated by horizontal separation 612 and vertical separation 614. Sensor 606 measures separation 610a to the surface (e.g., a surface of the build platform after residue is removed, a surface of a previously deposited and fused layer, etc.) and sends the measured separation to a rake control unit (not shown). The rake control unit then determines an inclination adjustment for rake 604. The cross-section depicted in FIGS. 6A-6D may correspond to a cross section taken through build platform 512 in the direction of motion of coater 502.

Given the sensor measurements, the rake control unit determines that when rake 604 moves by horizontal separation 612 from its current position, the height of the surface will change. Based on rake 604's current separation 608a, measured separation 610a, and the constant vertical separation between rake 604 and sensor 606, the rake control unit (not shown) can determine the height change between the current position of rake 604 and the position (corresponding to separation 612) ahead of rake 604. In some embodiments, the rake control unit determines a change in height 616 by comparing the measured separation 610a to the current separation 608a plus the sensor-rake separation 614. The rake control unit can then determine a change in the vertical position of rake 604 in order to deposit a layer of powder so that (1) the slope is reduced and/or (2) the maximum layer height is not exceeded. In this way, embodiments herein can advantageously add layers that are not too thick for full fusing when irradiated by a laser and compensate for topographies that vary in multiple directions.

Although FIGS. 6A-6D illustrate a single sensor (corresponding to a single cross-section), a coater (e.g., coater 300 or coater 502) can include two or more sensors. In such embodiments, another sensor also provides a measurement to the rake control unit and, in the same way as described for sensor 606, determines a vertical separation change for the rake in a cross section corresponding to that other sensor. In this way, the sensor system measures the topography of the surface by capturing first and second distances to a surface of a build platform at a first position of the coater and capturing third and fourth distances to the surface of the build platform at the second position of the coater. The rake control unit then receives the topography (e.g., the sensor measurements in process 600) and determines, based on the topography, an adjustment of the separation and/or inclination of the rake to a reference frame (by virtue of changing one or both of the positions of the rake as the rake moves from the first position to the second position). Based on the determined adjustment, the rake control unit sends command signals (e.g., the changes in positions of the rake) to motors that move the rake accordingly.

Figure 6A:
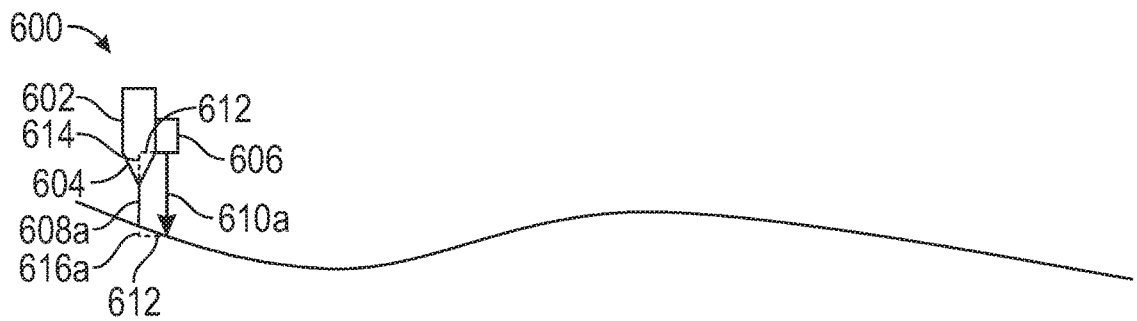
FIGS. 6A-6D illustrate an exemplary build platform levelling process, in accordance with an embodiment.

FIG. 6A illustrates the apparatus and separations without any powder deposition. In some embodiments, the sensors do not measure the topography of the surface without the coater depositing a layer of powder. In some embodiments, the topography is only measured when the coater is not depositing powder. In some embodiments, the topography is measured when the coater is and is not depositing a layer of powder.

Figure 6B:
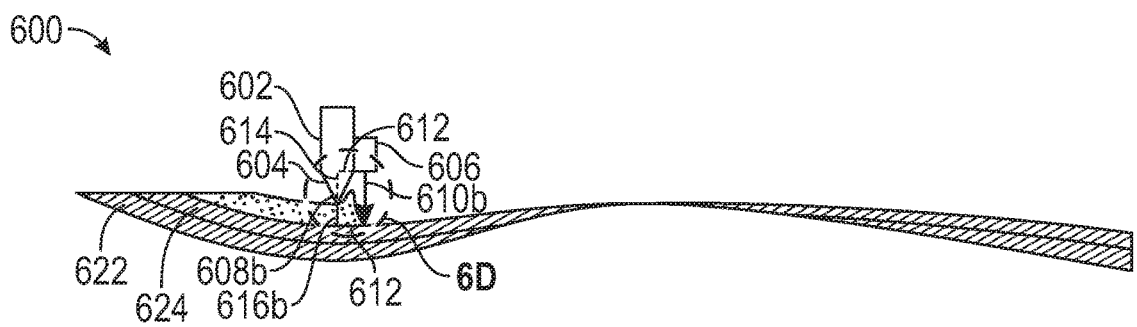
Figure 6C:
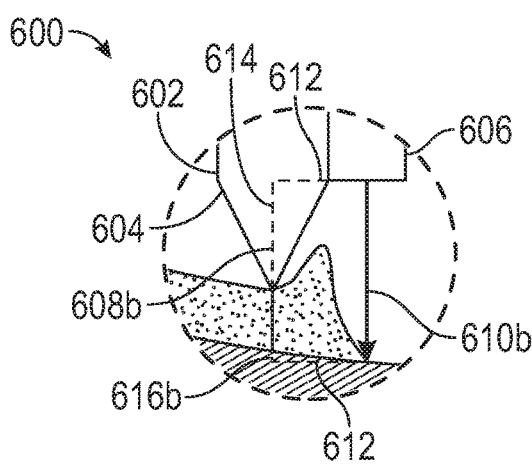

FIG. 6B illustrates the apparatus after one layer 622 is deposited and fused and a new layer 624 partially deposited (but not yet fused). As described above, sensor 606 measures a separation to the upcoming surface, and then a rake control unit determines a height change between the current position and the upcoming position. The rake control unit then adjusts a height and/or an inclination of rake 604 to ensure a maximum layer height is not exceeded. The coater may deposit less than the maximum depth (for example, the beginning portion of layer 624 is less than the depth further down the layer) to achieve a desired final surface. FIG. 6C is an enlargement of the coater 602 in FIG. 6B.

Compared to FIG. 6A, coater 602 is at a different position above the build platform. At this new position, sensor 606 measures a different separation 610b to the surface of layer 632. In combination with new separation 608b between the rake and surface of layer 622, the rake control unit determines a height difference 616b between the two positions. As with the position in FIG. 6A, the rake control unit can then determine a change in the vertical position of rake 604 in order to deposit a layer of powder so that (1) the slope is reduced and/or (2) the maximum layer height is not exceeded.

As shown in FIGS. 6B and 6C, powder builds up in front of rake 604 prior to the powder's distribution over the build platform. For this reason, the horizontal separation 612 may be equal to or greater than a minimum separation required to provide sufficient spacing to ensure that the powder build up does not obscure the sensors' view of the surface. In some embodiments, the horizontal separation is 3 mm. Similarly, a vertical separation 614 may be chosen so that the powder can build in the vertical direction and not force the powder horizontally to obscure the sensor's view of the surface.

For ease of explanation, certain aspects of the layer height and powder build up are exaggerated. For example, the relative dimensions of the layer and powder build-up shown in FIGS. 6B-6D can vary. In some embodiments, the maximum cross-sectional area of the powder-build up can be calculated using the platform area, the desired layer height, and the powder feed rate. For example, given a platform diameter of 110 mm, a layer height of 25 µm, and a powder feed rate of 220%, the volume of powder in each pass (platform area*layerheight*powder feed rate) is 500 mm$^3$. For the platform diameter of 110 mm, this gives a maximum (e.g., before powder has been distributed by the rake) cross-sectional area of powder build-up of 4.5 mm$^2$. For this example, the dimensions (approx. 75 mm×75 mm) of the cross-section area are over three orders of magnitude larger than the layer height (25 µm).

Figure 6D:
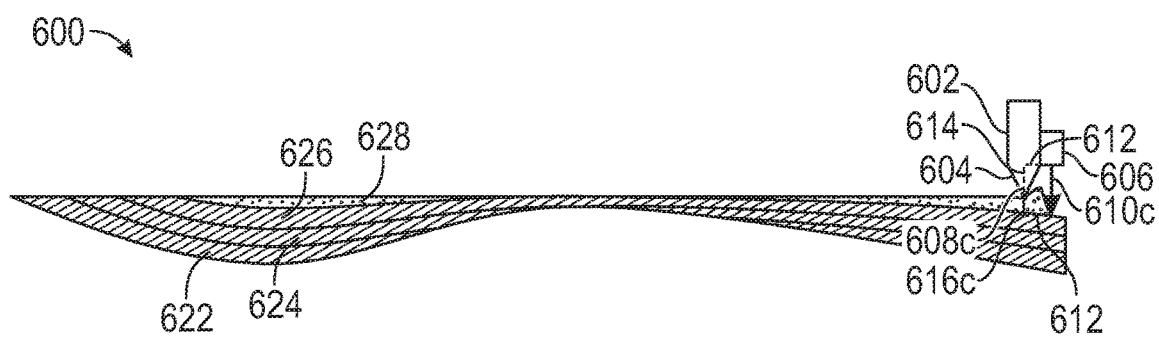

FIG. 6D illustrates process 600 after layers 622, 624, and 626 have been deposited and fused and layer 628 is partially deposited. After each of layer 622, 624, and 626 are deposited, a laser (not shown) irradiates the powder to fuse the layers. As shown, layer 628 is partially deposited and not yet fused. Sensor 606 measures a separation 608c to the surface in front of the rake, which the rake control unit determines corresponds to height difference 616c.

In some embodiments, process 600 and coater 602 are used to create a series of planar surfaces, where each layer is irradiated before the next layer is added. In such embodiments, an initial topography may be planar, but not level. Such a topography can be addressed with a series of inclination adjustments for each layer; inclination adjustments during deposition of each layer can be forgone. Such embodiments may also include an initially non-planar topography that becomes a planar, non-level topography after a series of layer deposits; inclination adjustments during deposition of each layer can be forgone. In these embodiments, the rake 604 has constant inclination while depositing a single layer of material and then changes inclination for the next layer of material.

Figure 7:
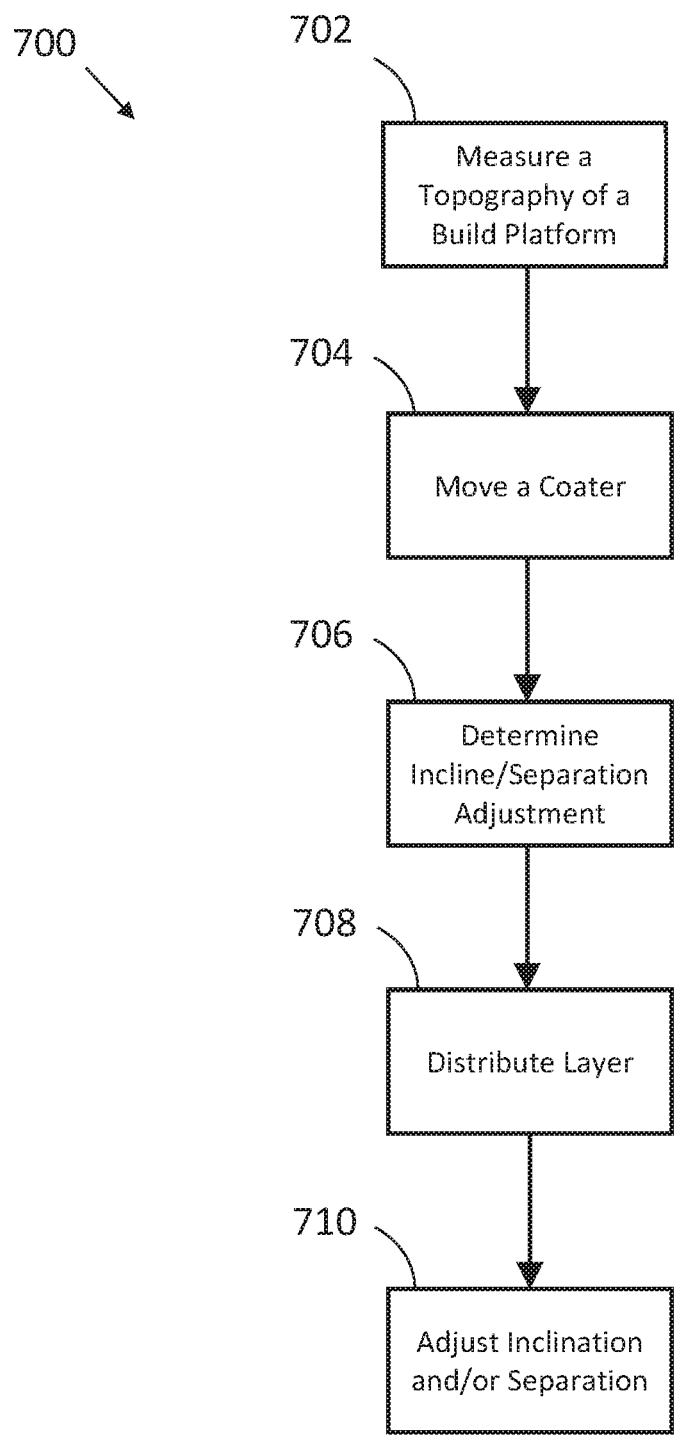
FIG. 7 is a flow diagram of an exemplary build platform levelling process, in accordance with an embodiment.

FIG. 7 is a method 700 of additive melting in accordance with an embodiment. Method 700 includes measuring a topography of a build platform 702, moving a coater (having a rake) in a plane above the build platform 704, determining (based on the topography) a separation adjustment and/or an inclination adjustment of the rake as the coater moves from a first position to a second position in the plane above the build platform 706, distributing a layer of powder (the layer having a non-planar top surface) on the build platform using the rake 708, and adjusting (based on the determined separation and inclination adjustment) a separation and/or an inclination of the rake relative to a reference plane as the coater moves from the first position to the second position 710.

In some embodiments, measuring a topography of a build platform includes: capturing first and second distances to a surface of the build platform at the first position of the coater above the build platform; and capturing third and fourth distances to the surface of the build platform at the second position of the coater above the build platform. In some embodiments, measuring a topography of a build platform includes measuring, using two capacitive sensors, the topography of the build platform.

In some embodiments, adjusting an inclination of the rake relative to a reference plane includes moving the rake relative to other elements of the coater. In some embodiments, adjusting an inclination of the rake includes changing a distance between the rake and the build platform at two positions by different values. In some embodiments, adjusting an inclination of the rake includes a first inclination adjustment at the first position during a first traversal along a path above the build platform and a second inclination adjustment during a second traversal along the path.

In some embodiments, moving a coater includes moving the rake in an arcuate path from the first position to the second position.

In some embodiments, the method includes: depositing a first volume of material at the first position; irradiating the first volume of material; depositing a second volume of material at the second position; and irradiating the second volume.

In some embodiments, the apparatus is configured to distribute a first volume of material as a non-planar top surface and irradiate the material. In some further embodiments, the apparatus is configured to distribute a second volume of material as a planar top surface and irradiate the material.

In some embodiments, some steps of method 700 are applied to create a series of planar surfaces, where each layer is irradiated before the next layer is added. In such embodiments, an initial topography may be planar, but not level. Such a topography can be addressed with a series of inclination adjustments for each layer; inclination adjustments during deposition of each layer can be forgone. Such embodiments may also include an initially non-planar topography that becomes a planar, non-level topography after a series of layer deposits; inclination adjustments during deposition of each layer can be forgone. In these embodiments, a method of additive melting includes measuring a topography of a build platform, moving a coater (having a rake) in a plane above the build platform, determining (based on the topography) a separation adjustment and/or an inclination adjustment of the rake as the coater moves from a first position to a second position in the plane above the build platform, and adjusting (based on the determined separation and inclination adjustment) a separation and/or an inclination of the rake relative to a reference plane as the coater moves from the first position to the second position, where the first and second positions correspond to different layers depositions.

Figure 8:
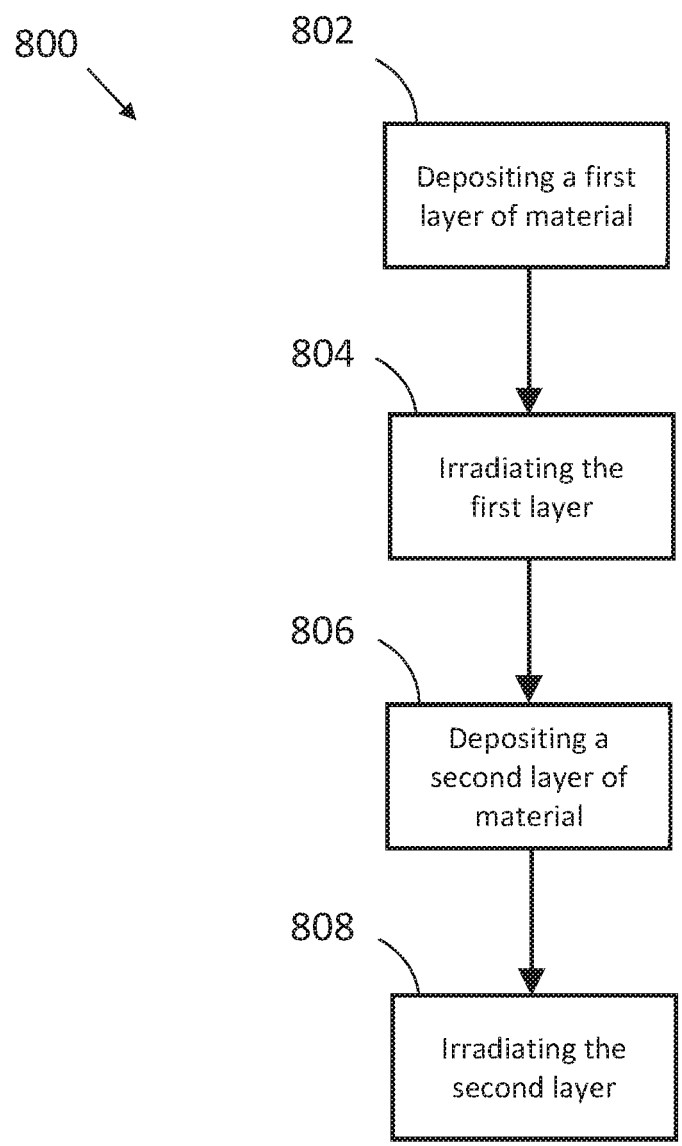
FIG. 8 is a flow diagram of an exemplary build platform levelling process, in accordance with an embodiment.

In some embodiments, the embodiments of FIG. 7 are combined with each other, the embodiments of FIG. 8, or any of the embodiments disclosed herein.

FIG. 8 is a method 800 of additive melting in accordance with an embodiment. Method 800 includes depositing a first layer of material on a build platform by inclining a rake relative to a reference plane during the depositing 802, irradiating the first layer of material to create a first non-planar surface (of the build platform) 804, depositing a second layer of material on the build platform by inclining the rake relative to the reference plane during the depositing 806, and irradiating the second layer of material to create a second non-planar surface 808.

In some embodiments of method 800, depositing a first layer includes measuring a topography of the building platform and inclining the rake relative to the reference frame includes inclining the rake based on the measured topography.

In some embodiments of method 800, depositing a first layer includes moving the rake over a position on the build platform and inclining the rake at a first inclination to the reference plane and depositing a second layer includes moving the rake over the position on the build platform and inclining the rake at a second inclination to the reference plane.

In some embodiments, some steps of method 800 are applied to create a series of planar surfaces, where each layer irradiated before the next layer is added. In such embodiments, an initial topography may be planar, but not level. Such a topography can be addressed with a series of inclination adjustments for each layer; inclination adjustments during deposition of each layer can be forgone. Such embodiments may also arise where an initially non-planar topography becomes a planar, non-level topography after a series of layer deposits; inclination adjustments during deposition of each layer can be forgone. In these embodiments, a method of additive melting includes depositing a first layer of material on a build platform by inclining a rake relative to a reference plane during the depositing, irradiating the first layer of material to create a first planar, non-level surface (of the build platform), depositing a second layer of material on the build platform by inclining the rake relative to the reference plane during the depositing, and irradiating the second layer of material to create a second planar, non-level surface.

In some embodiments, the embodiments of FIG. 8 are combined with each other, the embodiments of FIG. 7, or any of the embodiments disclosed herein.

As described above, sections of a build platform's topography can be measured, for example, the sections of the topography within the horizontal range (e.g., from the perspective given in FIG. 3A) of two sensors (e.g., sensors 306a and 306b of coater 300). In other embodiments, the entire topography is measured using, for example, a 3D scanner to obtain a full topography of a build platform (e.g., build platform 310). Entire topographies can be measured with, for example, additional sensors on a build platform or a surveying device, such as a LIDAR device. The mapped topography (sectional or full) can be used to calculate a build procedure.

As described herein, a rake control unit receives a topography of a build platform and sends instructions to control an inclination of a rake. In some embodiments, the received topography is the distance between the sensor and a surface in front of the coater while depositing material (for example, see embodiment described above with respect to FIGS. 6A-6D). In some embodiments, the rake control topography receives an entire topography. In such embodiments, the rake control unit can determine the deepest trough to be filled and, from that trough, determines the number (based on, for example, minimizing the number of passes, minimizing the overall time, integrity of the combined layers, etc.) of passes required to level the build platform. Using that number of passes, the rake control unit then determines the amount of material to deposit at each cross-section at each pass and the corresponding inclination of the rake during that pass at that particular cross-section. For example, for a wedge-shape cross-section, the control unit gradually reduces the inclination of the rake at each pass until the build platform is level and such that the height of every deposited layer is within a maximum layer height for fusing material. Nearby-topography may also influence the layer height at a particular cross-section. In some embodiments, the rake can move in 2-dimensions (e.g., in addition to changing roll described in the embodiments above, the rake can also change yaw).

The present invention is described above with reference to preferred embodiments. The invention, however, is not limited to the embodiments described and depicted herein. Rather the invention is limited only by the claims appended hereto. The use herein of "including," "comprising," "having," "containing," "involving," and variations thereof is meant to encompass the items listed thereafter and equivalents thereof as well as additional items. As used herein, the singular forms "a", "an," and "the" are intended to include the plural forms as well, unless the context clearly indicates otherwise.

What is claimed is:

1. A method of additive manufacturing comprising:
   measuring a topography of a build platform;
   moving a coater above the build platform, the coater having a rake;
   determining, based on the topography, an inclination adjustment of the rake as the coater moves from a first position above the build platform to a second position above the build platform, wherein the inclination adjustment is relative to a reference plane; and
   distributing a layer of powder on the build platform using the rake, the layer having a non- planar top surface;
   adjusting, based on the determined inclination adjustment, an inclination of the rake as the coater moves from the first position to the second position.

2. The method of claim 1, wherein measuring a topography of a build platform comprises:
   capturing first and second distances to a surface of the build platform at the first position of the coater above the build platform; and
   capturing third and fourth distances to the surface of the build platform at the second position of the coater above the build platform.

3. The method of claim 1, wherein measuring a topography of a build platform comprises measuring, using two capacitive sensors, the topography of the build platform.

4. The method of claim 1, wherein adjusting an inclination of the rake comprises moving the rake relative to other elements of the coater.

5. The method of claim 1, wherein adjusting an inclination of the rake relative to the reference plane includes changing a distance between the rake and the build platform at two positions by different values.

6. The method of claim 1, wherein adjusting an inclination of the rake relative to the reference plane comprises a first inclination adjustment during a first traversal along a path above the build platform and a second inclination adjustment during a second traversal along the path.

7. The method of claim 1, wherein moving a coater comprises moving the rake in an arcuate path from the first position to the second position.

8. The method of claim 1, further comprising:
   depositing a first volume of material at the first position;
   irradiating the first volume of material;
   depositing a second volume of material at the second position; and
   irradiating the second volume.

* * * * *